United States Patent
Henkel et al.

(10) Patent No.: US 11,425,221 B1
(45) Date of Patent: Aug. 23, 2022

(54) RUNTIME EXTENSIBLE APPLICATION PROGRAMMING INTERFACE SERVER

(71) Applicant: Juniper Networks, Inc., Sunnyvale, CA (US)

(72) Inventors: Michael Henkel, Saratoga, CA (US); Akhilesh Pathodia, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/446,923

(22) Filed: Sep. 3, 2021

(51) Int. Cl.
- *H04L 67/133* (2022.01)
- *H04L 67/1097* (2022.01)
- *H04L 67/5682* (2022.01)
- *H04L 67/01* (2022.01)

(52) U.S. Cl.
CPC .......... *H04L 67/40* (2013.01); *H04L 67/1097* (2013.01); *H04L 67/2852* (2013.01); *H04L 67/42* (2013.01)

(58) Field of Classification Search
CPC . H04L 67/40; H04L 67/1097; H04L 67/2852; H04L 67/42
See application file for complete search history.

(56) References Cited

U.S. PATENT DOCUMENTS

| | | | |
|---|---|---|---|
| 5,671,353 A * | 9/1997 | Tian | H04L 67/00 714/48 |
| 9,258,195 B1 | 2/2016 | Pendleton et al. | |
| 10,200,248 B1 | 2/2019 | Jiang et al. | |
| 10,516,761 B1 | 12/2019 | A et al. | |
| 2003/0020764 A1 | 1/2003 | Germain et al. | |
| 2009/0327903 A1 | 12/2009 | Smith et al. | |
| 2015/0149611 A1 | 5/2015 | Lissack | |
| 2016/0294981 A1 | 10/2016 | Takezawa et al. | |
| 2017/0163565 A1 * | 6/2017 | Moran, Jr. | G06Q 10/0631 |

(Continued)

FOREIGN PATENT DOCUMENTS

WO    2013184846 A1    12/2013

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.

(Continued)

*Primary Examiner* — El Hadji M Sall
(74) *Attorney, Agent, or Firm* — Shumaker & Sieffert, P.A.

(57) ABSTRACT

A device comprising a memory and a processor may be configured to perform techniques by which to provide a runtime extensible application programming (API) server. The memory may store a datastore that includes a data model. The processor may execute the API server by which to access the data model stored to the datastore. The API server may receive, from a controller, a registration request (providing a resource definition specifying a semantic validation rule) to register a new data model to the datastore, and register the new data model to the datastore. The API server may next receive, from a client, a create request to create a resource for the new data model having initial data that conforms to the resource definition, apply the semantic validation rule to the initial data, and create, responsive to validating the create request, the resource for the new data model in the datastore.

20 Claims, 9 Drawing Sheets

(56) References Cited

U.S. PATENT DOCUMENTS

| | | | |
|---|---|---|---|
| 2017/0237687 A1* | 8/2017 | Sanders | H04L 12/6418 |
| | | | 709/226 |
| 2017/0358111 A1 | 12/2017 | Madsen | |
| 2018/0102934 A1* | 4/2018 | Ly | H04L 67/141 |
| 2020/0082056 A1* | 3/2020 | Hasegawa | G06F 21/54 |
| 2020/0366752 A1 | 11/2020 | White | |
| 2021/0232485 A1 | 7/2021 | Agarwal et al. | |

OTHER PUBLICATIONS

Enns, "NETCONF Configuration Protocol," Network Working Group, RFC 4741, Dec. 2006, 95 pp.

Harrington et al., "An Architecture for Describing Simple Network Management Protocol (SNMP) Management Frameworks," Network Working Group, RFC 3411, Dec. 2002, 64 pp.

U.S. Appl. No. 17/364,630, filed Jun. 30, 2021, naming inventors Ottamalika et al.

U.S. Appl. No. 17/364,637, filed Jun. 30, 2021, naming inventors Ottamalika et al.

Przygienda et al. "RIFT: Routing in Fat Trees", draft-ietf-rift-rift-01, RIFT Working Group, Internet-Draft, Apr. 26, 2018, 78 pp.

"Implementing Remote Procedure Calls with gRPC and Protocol Buffers" DigitalOcean, LLC, Nov. 12, 2020, available at https://scotch.io/tutorials/implementing-remote-procedure-calls-with-grpc-and-protocol-buffers (last accessed Sep. 3, 2021), 22 pp.

Tuch "Dynamic extensibility andProtocol Buffers" Envoy Proxy, Nov. 30, 2017, 6 pp.

"Dynamic_message.h" Protocol Buffers, Google Developers, Google, Inc. Nov. 1, 2019, 2 pp.

Baeldung "Spring Rest API with Protocol Buffers" Baeldung.com, Feb. 12, 2020, 10 pp.

\* cited by examiner

RUNTIME EXTENSIBLE APPLICATION PROGRAMMING INTERFACE SERVER

TECHNICAL FIELD

This disclosure relates to computer networks and, more specifically, application programming interface servers within computer networks.

BACKGROUND

A data center is a collection of interconnected computer servers and associated components, housed in one or more facilities. In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities.

Data centers are often made up of a large number of devices, including both servers and devices that form an Internet Protocol (IP) fabric. The IP fabric may be represented as an underlay network having leaf and spine devices. In these larger data centers, a network controller or other network management device may orchestrate network functions based on business intents, which are then translated into network functions that are configured within the datacenter and supported by the IP fabric. The business network administrators may interface with the network controller to configure the underlay network in various topologies having certain features in order to support the business intents (which may also be referred to as "intents").

Such network controllers may include a distributed hierarchy of components in which controllers execute to deploy various topologies (e.g., 3-stage Clos, 5-stage Clos, hypercube, butterfly, etc.) or features (e.g., routing protocols, database structure—e.g., structured query language, graph, proprietary, etc., quality of service, and the like) and an application programming interface (API) server that manages an underlying datastore storing data models representative of the network topology and features. The API server may perform semantic and syntax validation with respect to the data model to ensure that data to be stored to the data model (according to the data model schema) is valid. The API server may facilitate dynamic, real-time definition of network topologies that adhere to business intents, while also identifying updates, edits, creation, and/or deletions of data within the data models, alerting controllers of such modifications so that the controllers may maintain the deployed topologies within the IP fabric.

To update or otherwise change the topologies or other features (e.g., to incorporate more efficient network operation, provide new capabilities, and/or adapt to changing business networking requirements), the network administrators may perform a complicated process of updating the underlying controllers and API servers that may be prone to user error, while also requiring significant development that may delay implementations of the changes, or in some instances, require compromises in validation of data models.

SUMMARY

In general, this disclosure describes techniques for a runtime extensible application programming interface (API) server that may facilitate runtime extension of new topologies and/or features while also promoting extensible definition of semantic validation for new topologies and/or features. Rather than require extensive development of controllers to support new topologies and/or features (which may be denoted as "topologies/features") along with development of API servers to accommodate new semantic validation, various aspects of the techniques described in this disclose may enable a modular architecture in which API servers become topology/feature agnostic by providing a defined interface by which to specify new data models representative of the new topology/feature and a semantic validation interface by which new semantic validation rules may be defined relative to the new data models. As such, only controllers need be developed to provide the new data model and register such data model with the API server and then deploy the new topology/feature within a data center fabric.

In addition, once monolithic controllers for a given topology/feature may be broken into sub-controllers that handle discrete aspects of a given topology/feature to promote reusability across topology deployments, data center customers, etc. That is, a monolithic controller for a given customer that requires, as one example, a 3-stage Clos using a border gateway protocol (BGP) may be split into two or more controllers (e.g., a controller for the 3-stage Clos, and another controller for BGP) such that each individual controller may be quickly retooled and deployed across customers that require a 3-stage Clos and/or BGP (but with different BGP options and/or configurations). Because the API server is topology/feature agnostic and largely serves as a validation and watch function within the larger network controller, the API server may interface with each of the individual controllers to alert the individual controllers of changes with respect to data models registered to those controllers.

In this way, various aspects of the techniques may facilitate more granular controllers having underlying API servers that are extensible at runtime given that a set interface is provided by which to introduce new data models (representative of topology/feature) without requiring extensive development of a topology/feature specific API server. This interface provided by the API server may also enable definition of semantic validation rules at runtime to promote semantic validation of the new data models. As controllers are more granular, development of controllers and subsequent redeployment may occur more rapidly in comparison to monolithic controller/API server architectures, potentially reducing development of controllers to weeks rather than months (or even a year plus). Such increase rates of development may enable topology/feature expansion that facilitates more efficient network operation of both network controllers and data center fabrics (as often new topologies/features result in more efficient operation of the data center) while also promoting semantic validation of business intents to ensure proper configuration and operation of the data center fabric in support of business intents.

In one example, various aspects of the techniques are directed to a method comprising: executing, by a processor, an application programming interface (API) server by which to access one or more data models stored to a datastore; receiving, by the API server and from a controller, a registration request to register a new data model to the datastore, the registration request providing a resource definition specifying a semantic validation rule; registering, by the API server, the new data model to the datastore; receiving, by the API server and from a client, a create request to create a resource for the new data model having initial data that conforms to the resource definition; applying, by the API server, the semantic validation rule to the initial data in order to validate the create request; and creating, by the API server and responsive to validating the create request, the resource for the new data model in the datastore.

In another example, various aspects of the techniques are directed to a device comprising: a memory configured to store a datastore that includes one or more data models; and one or more processors configured to: execute an application programming interface (API) server by which to access the one or more data models stored to the datastore, wherein the API server is configured to: receive, from a controller, a registration request to register a new data model to the datastore, the registration request providing a resource definition specifying a semantic validation rule; register the new data model to the datastore; receive, from a client, a create request to create a resource for the new data model having initial data that conforms to the resource definition; apply the semantic validation rule to the initial data in order to validate the create request; and create, responsive to validating the create request, the resource for the new data model in the datastore.

In another example, various aspects of the techniques are directed to a system comprising: a memory configured to store a datastore that includes one or more data models; and one or more processors configured to execute an application programming interface (API) server and a controller, wherein the controller is configured to: transmit, to the API server, a registration request to register a new data model to the datastore, the registration request providing a resource definition specifying a semantic validation rule; wherein the API server configured to: receive the registration request to register a new data model to the datastore; register the new data model to the datastore; receive, from a client, a create request to create a resource for the new data model having initial data that conforms to the resource definition; apply the semantic validation rule to the initial data in order to validate the create request; and create, responsive to validating the create request, the resource for the new data model in the datastore.

The details of one or more examples are set forth in the accompanying drawings and the description below. Other features, objects, and advantages will be apparent from the description and drawings, and from the claims.

DETAILED DESCRIPTION

Figure 1:
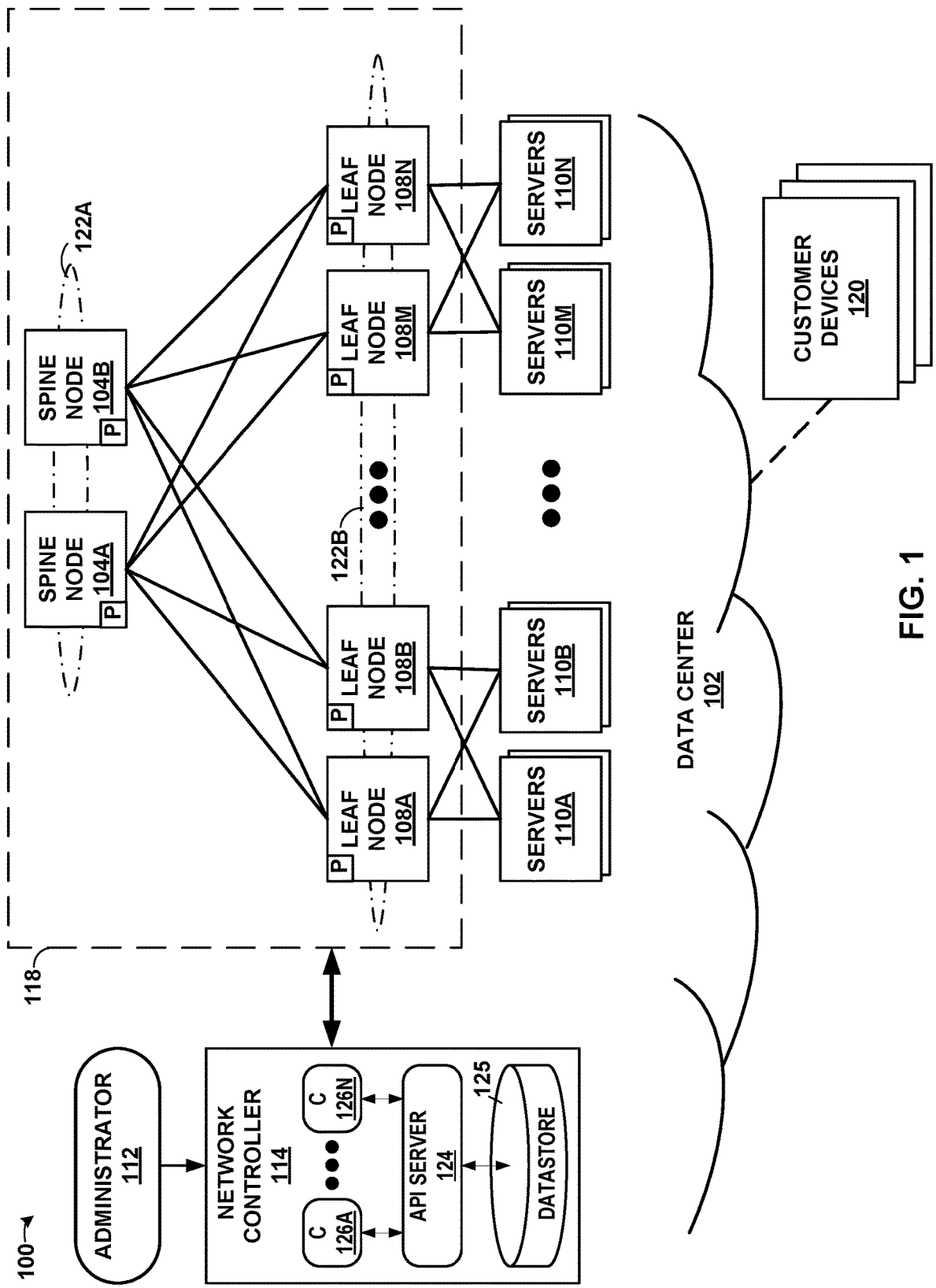
FIG. 1 is a block diagram illustrating networks having data centers, in accordance with techniques of the disclosure.

FIG. 1 is a block diagram illustrating networks having data centers, in accordance with techniques of the disclosure. In the example approaches of FIG. 1, network 100 includes a data center 102 connected to customer devices 120. Data center 102 includes a set of storage systems and application servers 110A-110N (servers 110) interconnected via Internet protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices.

In general, data center 102 provides an operating environment for applications and services for customer devices 120 coupled to the data center, e.g., by a service provider network (not shown). Data center 102 may, for example, host infrastructure equipment, such as networking and storage systems, redundant power supplies, and environmental controls. In some examples, a service provider network that couples customer devices 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example approaches of FIG. 1, data center 102 may be a facility that provides network services for customers through customer devices 120. Customer devices 120 may include the devices of entities (such as enterprises and governments) and of individuals. For example, a network data center may host web services for both enterprises and end users. Other example services may include data storage, virtual private networks, traffic engineering, file service, data mining, scientific- or super-computing, and so on. In some examples, data center 102 may be individual network servers, network peers, or otherwise. In some examples, data center 102 is an enterprise or internal data center.

In these examples, data center 102 includes a set of storage systems and application servers 110A-110N (servers 110) interconnected via Internet protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices. In the examples shown, IP fabric 118 includes two tiers of nodes: spine nodes 104A and 104B (spine nodes 104) and leaf nodes 108A-108N (leaf nodes 108). Servers 110 provide execution and storage environments for applications and data associated with customers via customer devices 120 and may be physical servers, virtual machines or combinations thereof.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In the examples shown in FIG. 1, IP fabric 118 includes two tiers of nodes: spine nodes 104A and 104B (spine nodes 104) and leaf nodes 108A-108N (leaf nodes 108). Other topologies may be used in other examples. Servers 110 provide execution and storage environments for applications and data associated with customers via customer devices 120 and may be physical servers, virtual machines or combinations thereof.

In general, IP fabric 118 represents layer two (L2) and layer three (L3) switching and routing components that provide point-to-point connectivity between servers 110. In one example, IP fabric 118 comprises a set of interconnected, high-performance yet off-the-shelf packet-based routers and switches that implement industry standard protocols. In one example, IP fabric 118 may comprise off-the-shelf components that provide Internet Protocol (IP) point-to-point connectivity. In some multi-staged networks such as IP fabric 118, each switch resides in a defined layer of the network. As shown in the example of FIG. 1, spine nodes 104 reside in a first, top layer 122A and leaf nodes 108 reside in a second layer 122B (collectively, "network layers 122"). As shown in the example of FIG. 1, each of spine nodes 104 is communicatively coupled to each of leaf nodes 108A-108N.

In one example approach, IP fabric 118 is configured as a multi-stage network. Multi-stage data center networks, such as Clos or networks with a so-called "fat tree" topology, may be used in data centers for high performance and resiliency. In some example approaches, fat tree networks may allow for multi-pathing.

In one example approach, IP fabric 118 includes a Virtual Chassis Fabric (VCF). VCF may be used to provide a low-latency, high-performance fabric architecture that can be managed as a single device. A VCF is constructed using a spine-and-leaf architecture. In the spine-and-leaf architecture, each spine device is interconnected to one or more leaf devices. A VCF may support up to twenty total devices, and up to four devices may be configured as spine devices.

The VCF may be, in some examples, configured to allow path weights that reflect and react to a path's end-to-end bandwidth. Such a capability is termed "smart trunks" in VCF. Smart trunks capabilities may, in some example approaches, be enabled by a Virtual Chassis Control Protocol (VCCP) that runs inside a VCF to provide globally optimized weights on the multi-paths.

In one example approach, IP fabric 118 is a loosely-federated folded multi-stage network where all nodes of IP fabric 118 run IP routing protocols. The routing protocols, which may include, for example, external border gateway protocol (EBGP), include all paths between leaf nodes 108 in IP fabric 118, and equal cost multipath (ECMP) is used to utilize all paths. The Routing in Fat Trees (RIFT) protocol allows use of any set of all available least-hops paths disregarding ECMP constraints. Additional information regarding RIFT can be found in Internet-Draft entitled RIFT: Routing in Fat Trees (draft-ietf-rift-rift-01), dated Apr. 26, 2018, as promulgated by the Internet Engineering Task Force (IETF), which is incorporated herein by reference.

In the example of FIG. 1, network controller 114 provides a high-level controller for configuring and managing routing and switching infrastructure of data center 102. Network controller 114 may represent, for example, a software defined network (SDN) controller that communicates and manages the devices of data center 102 using an SDN protocol, such as the Path Computation Element (PCE) Communication Protocol (PCEP). In some examples, network controller 114 may communicate and manage the devices of data center 102 using eXtensible Messaging and Presence Protocol (XMPP), PCEP or Border Gateway Protocol messages. Additionally, or alternatively, network controller 114 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Network controller 114 provides a logically—and in some cases, physically—centralized controller for facilitating operation of one or more networks within data center 102 in accordance with examples of this disclosure. In some examples, network controller 114 may operate in response to configuration input received from network administrator 112. Additional information regarding network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

In one example approach, as illustrated in FIG. 1, network controller 114 communicates with nodes 104, 108 in order to configure and manage different topologies and/or features (which may be denoted as "topologies/features" or "topology/feature") within IP fabric 118. Topologies may refer to any topology implemented with respect to IP fabric 118, such as a 3-stage Clos, a 5-stage Clos, a hypercube, a butterfly, a fat-tree, etc. Features may refer to a routing protocol (such as EBGP, BGP, iBGP, intermediate system to intermediate system—IS-IS, open shortest path first—OSPF, etc.), a quality of service, multi-path, high availability, a forwarding mechanism, or any other feature supporting a topology.

In general, network traffic within IP fabric 118, such as packet flows between servers 110, may traverse the physical network of IP fabric 118 using many different physical paths according to the particular topologies and features. For example, a "packet flow" can be defined by values used in a header of a packet, such as the network "five-tuple," i.e., a source IP address, destination IP address, source port and destination port that are used to route packets through the physical network, and a communication protocol. The protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Network controller 114 may configure various topologies within IP fabric 118 to direct the traffic flows efficiently (e.g., avoid congestion and dropping of packets, increase utilization of nodes 104 and 108, provide a higher quality of service—QoS, and/or the like). Administrator 112 may initially interface with network controller 114 to configure topologies/features within IP fabric 118 in order to support business intents. That is, administrator 112 may interface with network controller 114 to configure IP fabric 118 to employ a particular topology for a given customer having various of the above identified features. Once configured, network controller 114 may render the configuration of IP fabric 118 (which implements the topology) opaque from the perspective of the customer. In other words, the customer may be unaware of the underlying topology of IP fabric 118, as it is unnecessary to understand the topology/features of IP fabric 118 in order to support the high-level intents.

In this respect, an intent is a high-level statement defining a networking business goal, such as create a virtual private network (VPN) between site A and site B. Network controller 114 may then translate that intent into low level configuration data for each of nodes 104 and 108 in order to support the intent. Network controller 114 may next interface with nodes 104 and 108 to deploy the configuration data that enables the intent within the particular topology of IP fabric 118 having the various features. Network controller 114 may perform syntax and semantic validation with respect to intents and the low-level configuration data to ensure the configuration data is valid and within the preconfigured business goals specified by the customer.

Syntax validation refers to a process in which configuration data is validated to ensure such configuration data is of the proper type (e.g., string, integer, array, etc.), size (e.g., bit depth or number of bytes), etc. Semantic validation refers to a process in which configuration data is validated to ensure such configuration data adheres to certain business goals, e.g., the configuration data includes an IP address that falls within an acceptable range, the configuration data employs a particular naming schema, the configuration data has a certain format or a certain arrangement of data, etc. In other words, syntax validation refers to whether the configuration data is defined in accordance with a given data schema defined for a data model specifying the topology/feature(s), while semantic validation refers to whether contents of the configuration data has meaning within the data schema in support of various business goals (or enterprise goals, individual goals, etc.).

In some architectures, network controller 114 may comprise a number of devices (virtual devices and/or physical devices) operating together to enforce certain aspects of operation of network controller 114. For example, network controller 114 may include an API server 124 that performs the syntax validation and possibly semantic validation with respect to a data stored to a datastore 125. API server 124 may represent a server that supports synchronous or asynchronous transactions (e.g., with regard to create, read, update, and delete—CRUD—operations performed with respect to data models defining how data is to be stored to datastore 125.

Synchronous API servers may support syntax and semantic validation, as synchronous API servers are fully aware (e.g., a programmed with semantic rules to support business goals for configuration data stored to datastore 125) of the data model and thereby may allow only CRUD operations that are semantically valid. Asynchronous API servers may, on the other hand, provide syntax validation but only provide very generic CRUD operations for generic data models, and thereby lack any semantic validation. Synchronous API servers "know" the data model because semantic validation rules are defined at compilation or startup time, which then prohibits runtime addition of new data models or even changing or adapting existing data models. Asynchronous API servers may enable runtime addition of new data models and updates to existing data models, but are unable to support semantic validation. API server 124 may therefore represent a synchronous API server 124 to provide syntax and semantic validation in order to ensure the business intents (and the configuration data translated therefrom) adheres to business goals.

API server 124 may store the configuration data for each node according to a data model defined for a given customer topology/feature(s). Network controller 114 may register data models with API server 124. Specifically, network controller 114 may include one or more controllers 126A-126N ("controllers 126") developed to register data models representative of the topology/feature(s) with API server 124, which may translate such data models into a data schema consistent with an underlying database supporting datastore 125 (e.g., a SQL database, an Oracle® database, a graph database, etc.). Once registered, clients (which are not explicitly shown in the example of FIG. 1, but may include an interface to network controller 114 provided by way of customer devices 120—such as a web interface to a portal/graphical user interface—GUI—hosted by network controller 114) may interact with API server 124 to specify intents with respect to a given data model, which API server 124 may pass to a registered controller of controllers 126 (e.g., controller 126A).

Controller 126A may then translate the intent into low-level configuration data for the given topology/feature(s) of IP fabric 118, where the low-level configuration data is specific to each of nodes 104 and 108 (or some subset of nodes 104 and 108 participating in support of the underlying topology/feature(s)). Controller 126A may interface with API server 124 to write the low-level configuration data to datastore 125, where API server 124 may perform syntax and semantic validation of the low-level configuration data. Assuming that the low-level configuration data is successfully validated (both syntactically and semantically), API server 124 may write the low-level configuration data to datastore 125 according to the underlying data schema (which may include translating the low-level configuration data into data supported by the data schema). API server 124 may interface with controller 126A to indicate successful write of the low-level configuration data to datastore 125, whereupon controller 126A may interface with IP fabric 118 to update nodes 104 and 108 to implement the intent.

As noted above, however, synchronous API servers may not, in some instances, support runtime extension of data models to support new topologies/features while also enabling semantic validation. Moreover, even when new data models are able to be added at runtime (although no semantic validation may be performed with respect to such new data models), updating the API server at runtime often involves a complicated process involving a manual intervention, a lack of any formal data modeling language, a proprietary code generator (for which some administrators may be inexperienced and therefore error prone), forms of communication that lack binary encoding, and limited streaming (e.g., lacking bi-direction streaming between client and server).

In this way, to update or otherwise change the topologies or other features (e.g., to incorporate more efficient network operation, provide new capabilities, and/or adapt to changing business networking requirements), administrator 12 may perform a complicated process of updating the underlying controllers and API servers that may be prone to user error, while also requiring significant development that may delay implementations of the changes, or in some instances, require compromises in validation of business intents.

In accordance with various aspects of the techniques described in this disclosure, API server 124 may facilitate runtime extension of new data models representative of topologies/features while also promoting extensible definition of semantic validation for new topologies/features. Rather than require extensive development of controllers 126 to support new topologies and/or features along with development of API servers to accommodate new semantic validation, various aspects of the techniques described in this disclose may enable a modular architecture in which API server 124 become topology/feature agnostic by providing a defined interface by which to specify new data models representative of the new topology/features and a semantic validation interface by which new semantic validation rules may be defined relative to the new data models. As such, only controllers 126 need be developed to provide the new data model and register such data model with API server 124 and then deploy the new topology/feature within a data center fabric, such as IP fabric 118.

In addition, by separating controllers 126 from API server 124 via the various interfaces supported by API server 124, once monolithic controllers for a given topology/feature may be broken into sub-controllers that handle discrete aspects of a given topology/feature to promote reusability across topology deployments, data center customers, etc. That is, a monolithic controller for a given customer that requires, as one example, a 3-stage Clos using a border gateway protocol (BGP) may be split into two or more controllers (e.g., a controller for the 3-stage Clos, and another controller for BGP) such that each individual controller may be quickly retooled and deployed across customers that require a 3-stage Clos and/or BGP (but with different BGP options and/or configurations). Because API server 124 is topology/feature agnostic and largely serves as a validation and watch function within network controller 114, API server 124 may interface with each of individual controllers 126 to alert individual controllers 126 of changes with respect to data models registered to those controllers 126.

In operation, API server 124 may access one or more data models stored to datastore 125 in the manner described above. API server 124 may wait for controllers 126 to connect. Network controller 114 may execute controllers 126, which may initialize and then generate a registration request to register a new data model to datastore 125. Controllers 126 may be developed with a preconfigured data model that defines data in support of topology/feature(s). The data model may conform to an industry standard, a proprietary standard, an open source standard, etc. and be specified in accordance with a formal data model language, such as the protocol buffer (often referred to as "protobuf"). Controllers 126 may register one or more data models via separate registration requests or a single shared registration request.

In any event, API server 124 may receive, from a controller, such as controller 126A, the registration request to register a new data model to datastore 125. As noted above, API server 124 may present this data model interface to register a new data model (to which the registration request conforms) and a semantic validation interface by which to specify semantic validation rules. In some instances, the data model interface includes the semantic validation interface, where definition of the data model may incorporate definition of the corresponding semantic validation rule to be applied to data specified in the fields of the data model. In this instance, the registration request may provide a resource definition specifying a semantic validation rule for the resource.

Responsive to receiving the registration request, API server 124 may register the new data model to datastore 125. API server 124 may maintain an association of data models to controllers (which may be referred to as a registration table), which API server 124 may update to indicate that controller 126A is associated with the new data model as part of processing the registration request. In addition, API server 124 may translate the database agnostic data model (meaning the data model is not defined for any particular database language) into a database conforming to a particular database language supporting data store 125. In some instances, datastore 125 may include a number of different databases using multiple different database languages, such as SQL, XQuery, Object Query Language (OQL), GraphQL, Language Integrated Query (LINQ), etc.

API server 124, after translating the data model into a data schema that conforms to the underlying database language of the database supporting datastore 125 to which the data model will be stored, stores the data schema to the database supporting datastore 125. API server 124 may also parse out the semantic validation rules during translation, maintaining a semantic validation rule set identifying to which resources of the data schema each semantic validation rule applies. API server 124 may then transmit an acknowledgement to controller 126A indicating that the data model was stored to datastore 125.

Clients (which again are not shown in the example of FIG. 1, but may be executed by customer devices 120) may then proceed to interface with network controller 114 (and more specifically API server 124) to generate various requests. For example, the client may generate a create request to create a resource for the new data model having initial data that conforms to the resource definition specified in the data model. In some instances, these requests do not directly originate from the clients. Instead, the clients will interface with network controller 114 to define intents, which invokes one of controllers 126 (e.g., controller 126A) that translates the intents into low-level configuration data. Controller 126A may then generate requests that create resources for the new data model. Controller 126A may then transmit the create request to API server 124.

API server 124 may receive, from a client (e.g., directly from the client or indirectly from the client via controller 126A), the create request to create the resource for the new data model having initial data that conforms to the resource definition. API server 124 may identify to which data model the create request applies via a unique controller identifier (UCI) specified in the create request identifying controller 126A. API server 124 may perform a lookup in the registration table using the UCI to identify the new data model. In some instances, the create request may also specify a data model unique identifier (DMUI) when controllers 126 are capable of registering multiple data models. API server 124 may then distinguish between multiple registered data models using the DMUI.

After identifying the new data model, API server 124 may determine a resource being created (e.g., parse a resource identifier—RID) from the create request. API server 124 may then identify a semantic validation rule specified in the resource definition for the resource (which may be associated with the RID and indexed such that API server 124 may perform a lookup in the semantic validation rule set using the RID to identify the semantic validation rule). API server 124 may apply the semantic validation rule to the initial data in order to validate the create request. API server 124 may then create, responsive to validating the create request, the resource for the new data model in the datastore.

In this way, various aspects of the techniques may facilitate more granular controllers 126 having underlying API server 124 that is extensible at runtime given that a set interface is provided by which to introduce new data models (representative of topology/feature) without requiring extensive development of a topology/feature specific API server 124. This interface provided by API server 124 may also enable definition of semantic validation rules at runtime to promote semantic validation of the new data models. As controllers 126 are more granular, development of controllers 126 and subsequent redeployment may occur more rapidly in comparison to monolithic controller/API server architectures, potentially reducing development of controllers 126 to weeks rather than months (or even a year plus). Such increase rates of development may enable topology/feature expansion that facilitates more efficient network operation of both controllers 114 and data center fabrics 118 (as often new topologies/features result in more efficient operation of data center 102) while also promoting semantic validation of business intents to ensure proper configuration and operation of data center fabric 118 in support of business intents.

While described with respect to a particular context, i.e, data center 102 in this example, various aspects of the techniques may apply generally to any API server that supports dynamic definition of data models. That is, any API server that requires dynamic, runtime extensibility while also supporting semantic validation may employ the foregoing techniques to facilitate rapid deployment of controllers that are capable of interfacing with the API server to manage data models while preserving semantic validation. As such, various aspects of the techniques should not be limited to networking contexts that involve a data center, IP fabric, or even network controllers, but may be deployed with respect to any API server within any computer network context. As such, the remaining examples provided below focus on interactions between the API server and controllers to illustrate generally the interface provided by the API server that allows for runtime extensibility and semantic validation without requiring restart, reinstall, or other disruptive processes.

Figure 2:
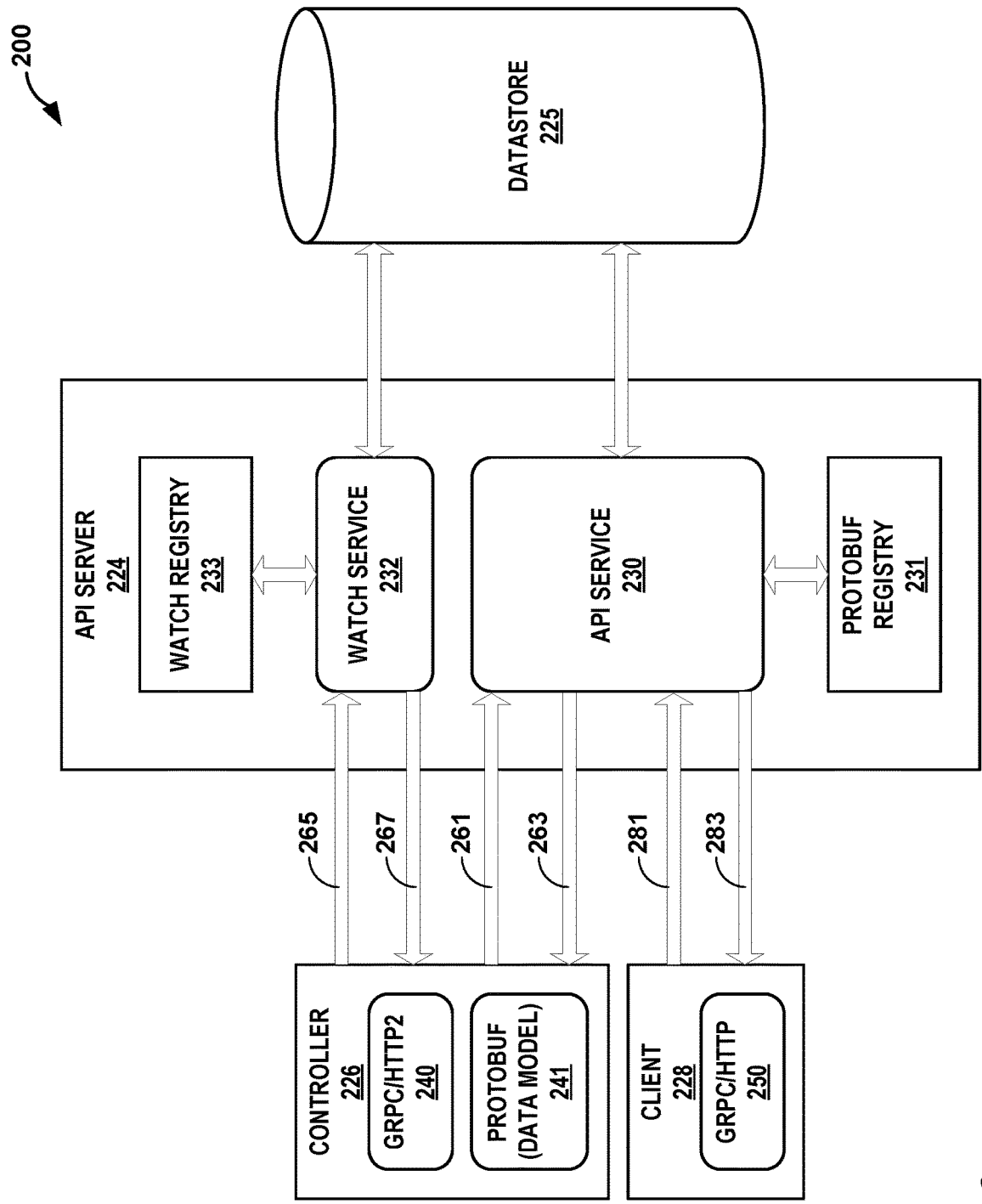
FIG. 2 is a block diagram illustrating an example system that includes a runtime extensible API server operating in accordance with various aspects of the techniques described in this disclosure.

FIG. 2 is a block diagram illustrating an example system that includes a runtime extensible API server operating in accordance with various aspects of the techniques described in this disclosure. In the example of FIG. 2, a system 200 includes an API server 224, a datastore 225, a controller 226, and a client 228. API server 224 may represent one example of API server 124, while datastore 225 may represent an example of datastore 125. Controller 226 may represent an example of controller 126. Client 228 may represent the above noted client described as being executed by customer devices 120.

In some instances, a single computing device, e.g., a server blade, a workstation, a desktop computer, a laptop computer, a network controller, etc., may execute API server 224 and controller 226. In other instances, a virtual computing device comprising one or more computing devices supporting execution of the virtual computing device may execute API server 224 and controller 226. In these instances, a logical (or in other words, virtual) computing device may execute different portions of system 200 that appear as a single physical computing device.

In any event, API server 224 may execute an API service 230 and a watch service 232. API service 230 may present an interface by which to register data models and define semantic validation rules. API service 230 may manage operations performed with respect to resources defined by the data models, such as create, read, update, and delete (CRUD) operations as noted above. API service 230 may present a RESTful API (REST API) that adheres to a set of architectural constraints, such as a client-server architecture made up of clients, servers, and resources, with requests managed through hypertext transfer protocol (HTTP) and stateless client-server communication (meaning no client information is sotred between get requests and each request is separate and unconnected. In addition, the REST API may require cacheable data that streamlines client-server interactions, and a uniform interface between components so that information is transferred in a standard format (e.g., protocol buffers, which may be referred to as "protobufs" or "protos"). The REST API may also require a layered system that organized each type of server involved in the retrieval of requested information into hierarchies that are transparent to the client, such as client 228.

API service 224 may also implement a remote procedure call framework denoted gRPC, which may allow client 228 to directly call a method on API service 230 executing on a separate, different computing device as if API service 230 were executing on the local machine executing client 228. API service 224 may thereby support REST API over HTTP and gRPC, providing a hybrid server that enables interactions between controller 226 and API server 224 via gRPC via HTTP version 2 (HTTP2), and interactions between client 228 via gRPC and HTTP that supports the REST API.

Watch service 232 may represent a service configured to register controllers and monitor, for registered controllers, data models stored to datastore 225. Watch service 232 may establish a stream over HTTP2 for registered controllers that enables watch service 232 to push events denoting the changes to the data models associated with the registered controllers. Watch service 232 may enable registered controllers to monitor and act on such events in near real-time so that controllers may adapt to changes to resources defined according to the associated data model. In the example of FIG. 1, controller 126A may identify a change in a BGP peer, for example, via events provided by watch service 232 and generate configuration data to reconfigure IP fabric 118 to improve operation of IP fabric 118 due to the change to the BGP peer. API service 230 may initially wait for controllers, such as controller 226 to connect to API server 224 and register new data models.

Controller 226, as shown in the example of FIG. 2, may include a gRPC/HTTP unit 240 and a protobuf 241 that defines the data model. Protobuf 241 refers to an open source framework by which to serialize structured data as well as define the parameters and return responses for the callable methods (of gRPC). More information regarding gRPC and protobufs can be found in an online article entitled "Implementing Remote Procedure Calls with gRPC and Protocol Buffers," available at scotch.io/tutorials/implementing-remote-procedure-calls-with-grpc-and-protocol-buffers, last access Aug. 25, 2021, the entire contents of which are hereby incorporated by reference.

Controller 226 may connect to API server 224, which in turn invokes API service 230. Controller 226 may initiate a gRPC message over HTTP2 requesting that protobuf 241 be registered within datastore 225. This gRPC message may represent an example of the above noted registration request, while the protobuf 241 may represent a new data model (along with a semantic validation rule) to be registered to datastore 225. Controller 226 may transmit the registration request (which is shown as registration request 261) to API service 230.

API service 230 may receive registration request 261 to register the new data model defined by protobuf 241, where again protobuf 241 may provide a resource definition specifying the semantic validation rule. The resource definition may define one or more resources in terms of one or more of a unique identifier, a resource type, a resource name, an API group, a version, a specification and a status, where the specification may include the semantic validation rule.

API service 230 may parse protobuf 241 to identify resource definitions and generate a data schema consistent with the underlying database language supporting datastore 225 to store the data model within the underlying database. API service 230 may also update protobuf registry 231, which may be one example of the registration table noted above with respect to the example of FIG. 1, to associate controller 226 with protobuf 241 and specify the semantic validation rule associated with the resource (or the various semantic validation rules associated with the various resources defined by the data model). API service 230 may generate a gRPC response message 263 acknowledging successful registration of the data model to datastore 225, transmitting the gRPC response message to controller 226.

Responsive to receiving gRPC response message 263, controller 226 may invoke gRPC/HTTP2 240 to generate a watch registration gRPC message 265 requesting that API server 224 register controller 226 for event stream monitoring of the new data model represented by protobuf 241 and stored to datastore 225. Controller 226 may transmit the watch registration gRPC message 263 to API server 224.

API server 224 receives watch registration gRPC message 263, and responsive to receiving watch registration gRPC message 263, invokes watch service 232, which may process watch registration gRPC message 263 to add controller 226 to watch registry 233. Watch registry 233 may store an association between controller 226 and the new data model stored to data store 225. Watch service 232 may establish the above noted event monitoring stream (where events may be specified as protobufs and transmitted via HTTP2) and thereafter monitor datastore 225 to identify any changes to the new data model stored to datastore 225.

Changes to the data model may include a create operation for a new resource according to the data model, a read operation of a resource stored according to the data model, an update operation performed with respect to a resource stored according to the data model, and a delete operation performed with respect to a resource stored according to the data model. Responsive to such changes to the data model, watch service 232 may generate a protobuf representative of the event and transmit the protobuf via HTTP2 to controller 226. The event stream is shown as an event stream 267, where the first event sent via event stream 267 may include an acknowledgement event that controller 226 has been successfully registered to watch registry 233.

Client 228 may include a gRPC/HTTP unit 250 that may operate similar to gRPC/HTTP2 unit 240 except that gRPC/HTTP may implement the first version of HTTP rather than HTTP version 2 (HTTP2). In any event, client 228 may present an interface by which administrators of customers may input business intents to execute some business goal, which may result in CRUD operations 281 being generated and transmitted via HTTP to API service 224.

API server 224 may receive CRUD operations 281, which may include a create request to create a resource for the new data model having initial data that conforms to the resource definition. Responsive to receiving CRUD operations 281, API server 224 may invoke API service 230, which processes CRUD operations 281, including the above noted create request. API service 230 may, as one example, process the create request by applying the semantic validation rule to the initial data in order to validate the create request. In some instances, API service 230 may also apply a syntax validation rule with respect to the initial data in order to complete validation of the create request. API service 230 may then create, responsive to validating the create request, the resource for the new data model in datastore 225. API service 230 may generate and transmit, to client 228, a gRPC response message 283 specifying that the resource was created in the data model stored to datastore 225.

Watch service 232 may, while monitoring datastore 225, determine that the resource was created for the data model stored to datastore 225. Watch service 232 may access watch registry 233 to determine that the modified data model is associated (or in other words, owned) by controller 226, and generate an event protobuf specifying that the resource was created for the new data model stored to datastore 225. Watch service 232 may transmit, via event stream 267, the event protobuf to controller 226. Controller 226 may process the even protobuf, translating the event protobuf according to programmed business logic.

Figure 3A:
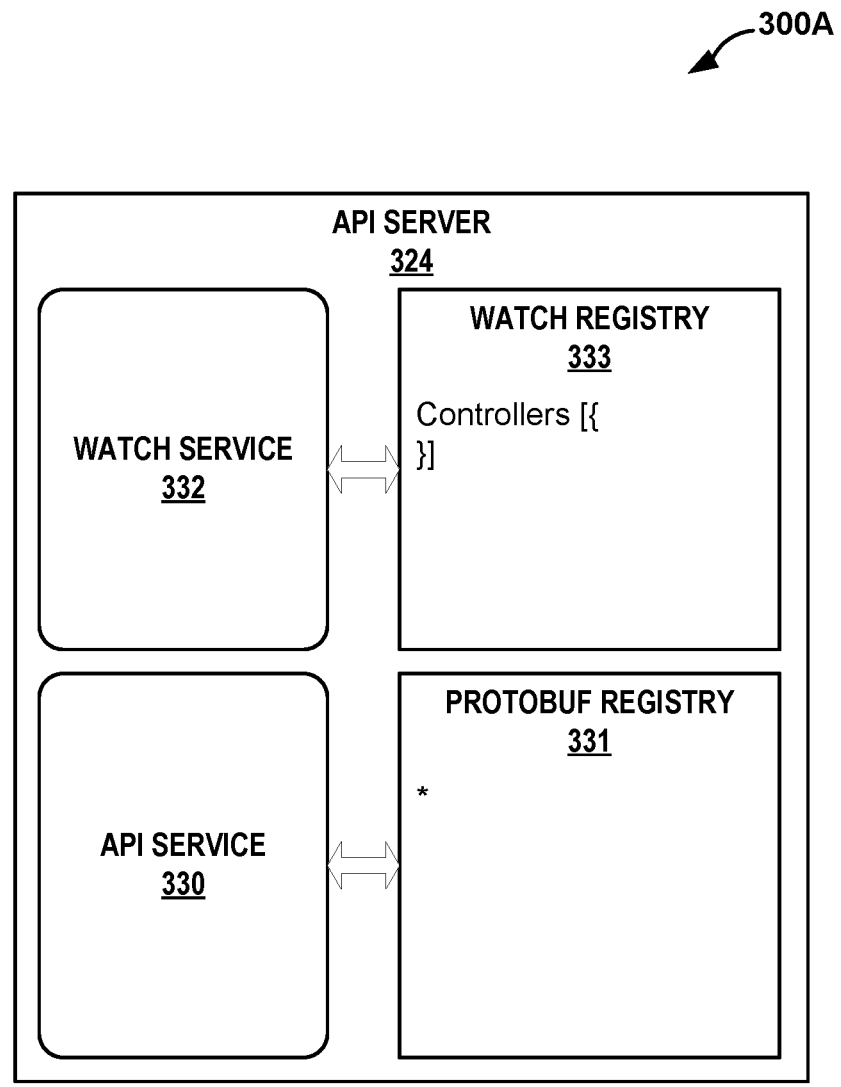
FIGS. 3A-3E are block diagrams illustrating another system including an example runtime extensible API server operating in accordance with various aspects of the techniques described in this disclosure.

FIGS. 3A-3E are block diagrams illustrating another system including an example runtime extensible API server operating in accordance with various aspects of the techniques described in this disclosure. Referring first to the example of FIG. 3A, a system 300A includes an API server 324, which may represent an example of API server 224 and/or 124. API server 324 includes an API service 330 and a watch service 332, where API service 330 may be similar if not substantially similar to API service 230 and watch service 332 may be similar if not substantially similar to watch service 232. API service 330, like API service 230, maintains a protbuf registry 331, while watch service 332, like watch service 232, maintains a watch registry 333. In the example of FIG. 3A, API server 324 initially has no knowledge of any data model or resource (meaning no registered protobufs in protobuf registry 331 and no registered controllers in watch registry 333).

Figure 3B:
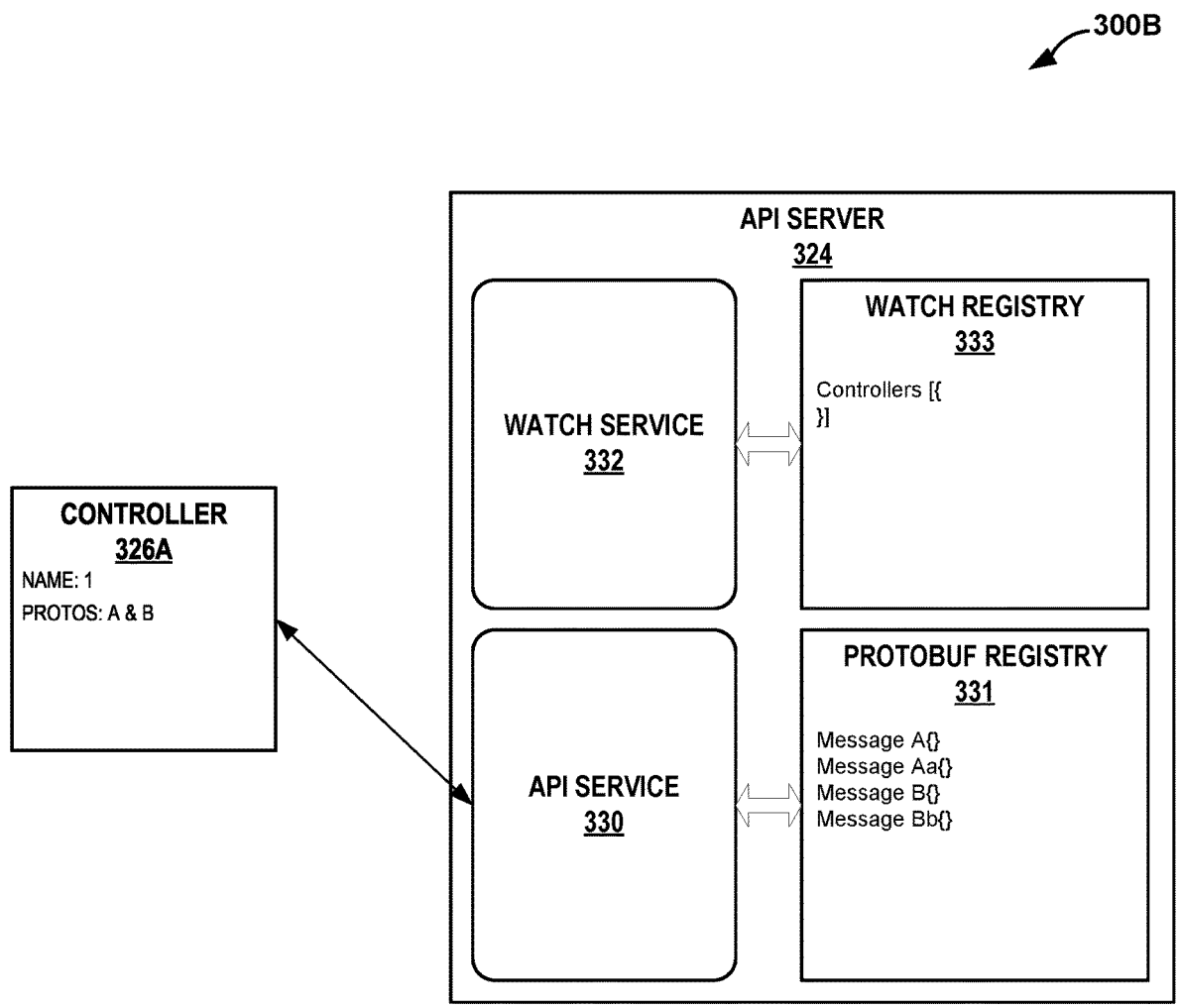

Referring next to the example of FIG. 3B, system 300A transitions to a system 300B in which controller 326A establishes a connection with API server 324. Controller 326A has an assigned name (which may be another way to refer to a unique identifier) of "1" and owns protos "A" and "B." As such, controllers generally have a 1 to n (1:n) data model ratio, where any controller may "own" multiple different data models. Controller 326A may register data models A and B with API server 324, where API service 330 updates protobuf registry 331 to specify messages A{ } and B{ } representative of data models A and B and all data models dependent of data models A and B (i.e., Aa and Bb in this example, which is denoted as messages Aa{ } and Bb{ }).

Figure 3C:
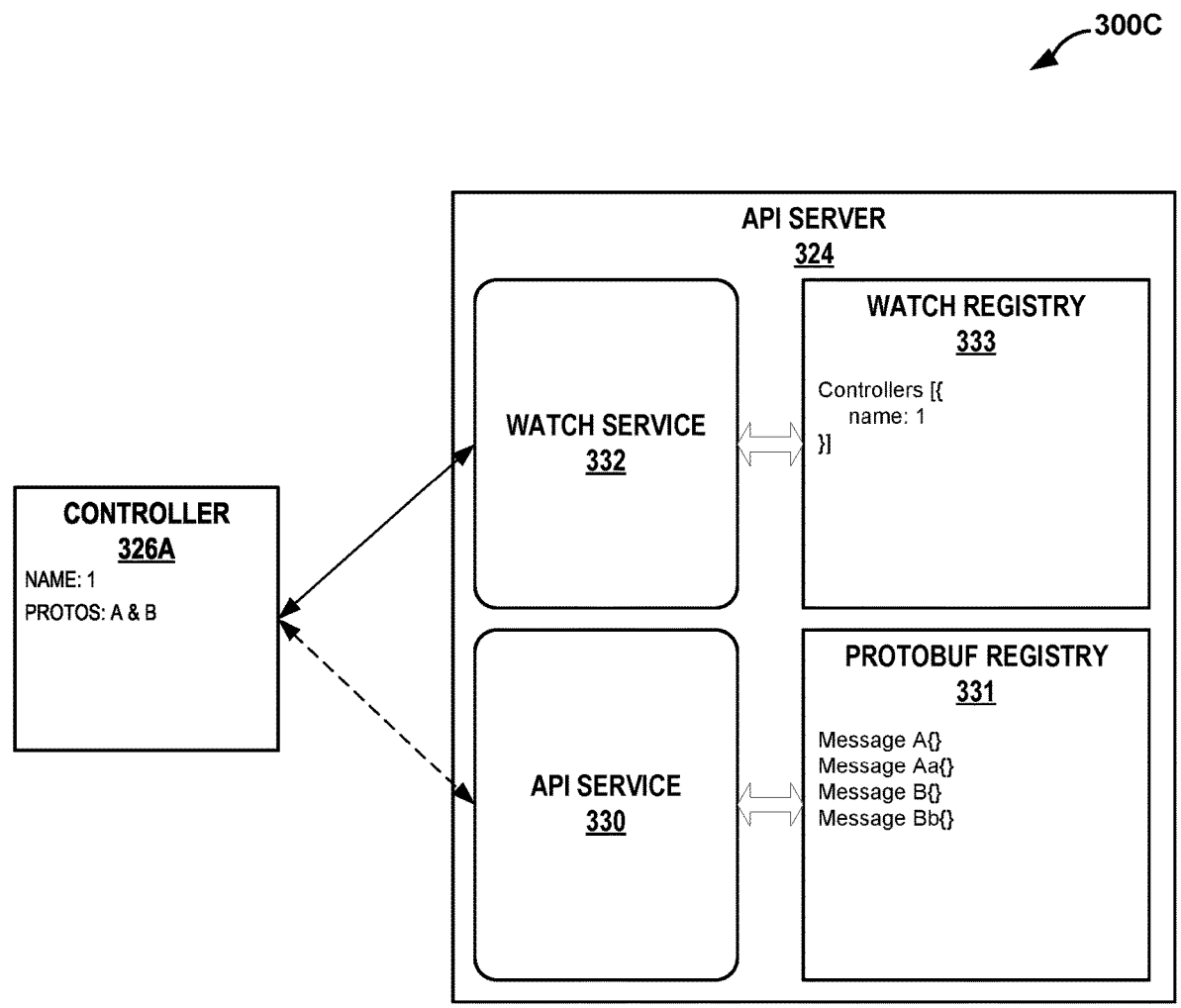

Referring next to the example of FIG. 3C, system 300B transitions to a system 300C in which controller 326A, after successfully registering protos A and B, interfaces with API server 324 to register controller 326A for event monitoring of protos A and B. In other words, controller 326A subscribes for events via watch service 332 of API server 324. Watch service 332 updates watch registry 333 to denote that controller 326A (having a "name 1") is registered for event monitoring of resources A and B. Watch service 332 may open an event stream and notifies controller 326A of any changes in resource A and B.

Figure 3D:
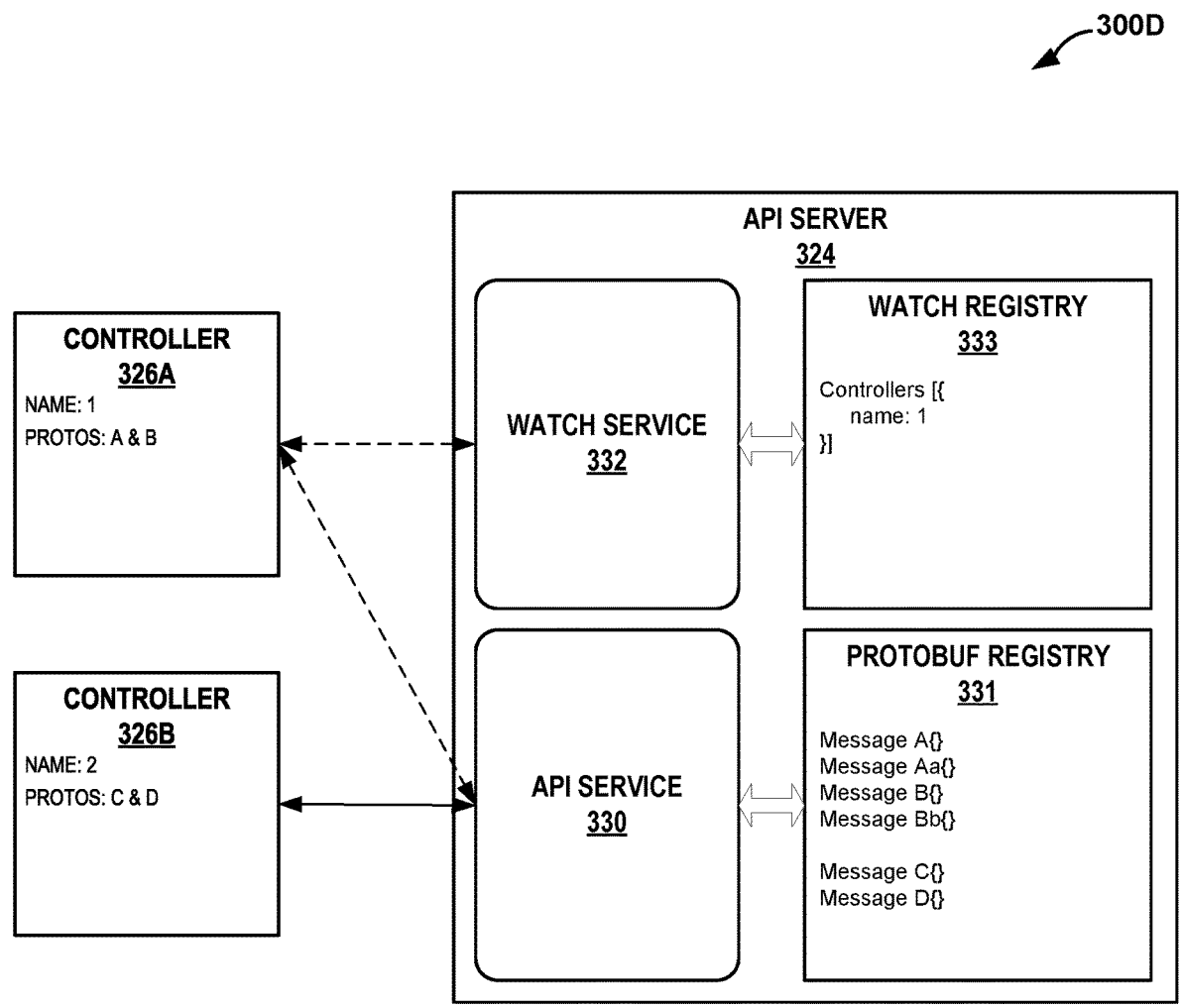

Referring next to the example of FIG. 3D, system 300C transition to a system 300D in which another controller 326B having name "2" owns protos "C" and "D." Controller 326B may access API server 324 by invoking gRPC API to API service 330 to register protos C and D, which API service 330 may register to protobuf registry 331 as message C0 and message D{ }.

Figure 3E:
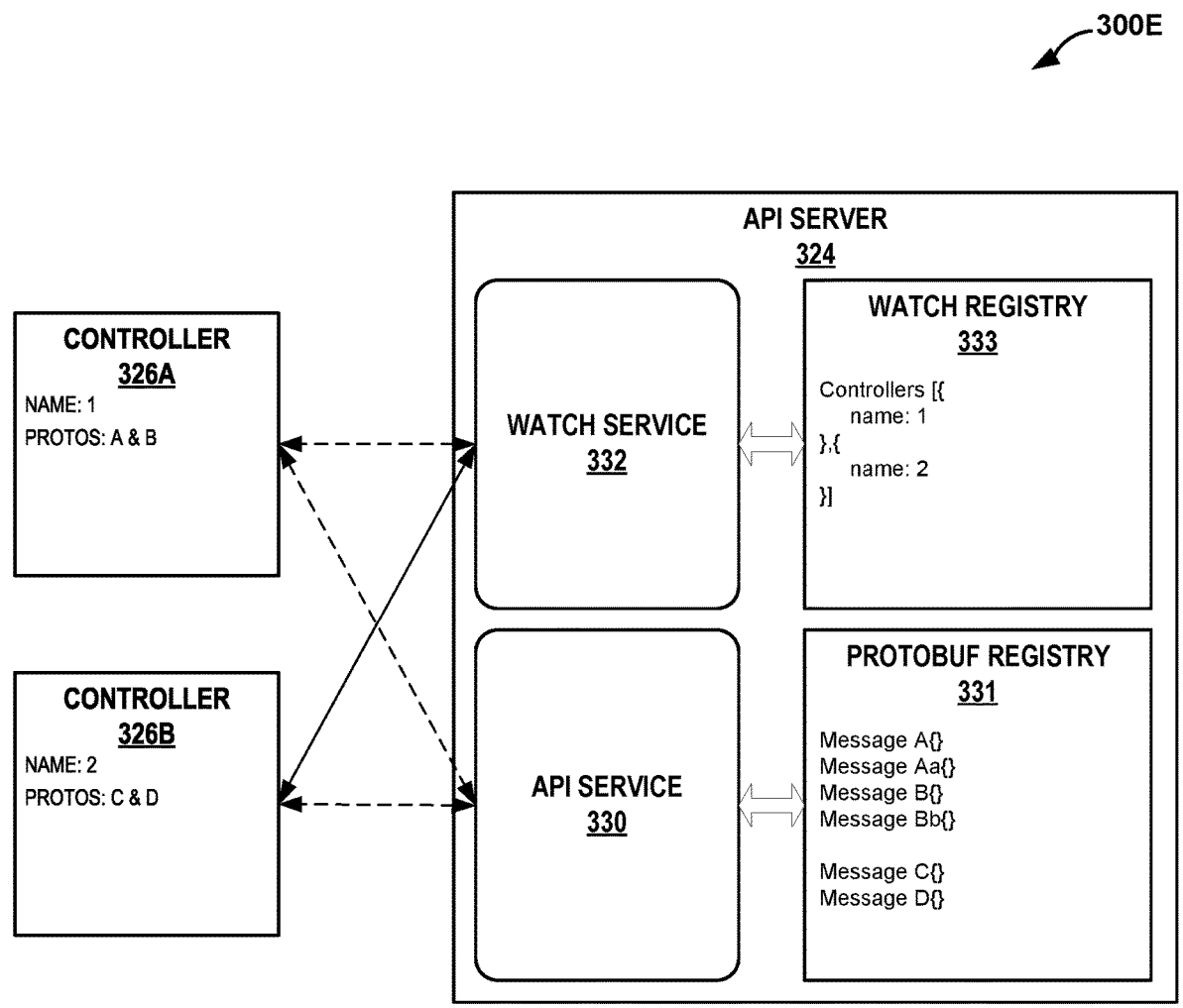

Referring next to the example of FIG. 3E, system 300D transitions to a system 300E in which controller 326B interfaces with watch service 332 to register controller 326B with API server 324. Watch service 332 may update watch registry 333 to register controller 326B by "name: 2" in the list of registered controllers. Watch service 332 may also establish an event stream with controller 326B and thereafter notify controller 326B of any change in resource C and D.

As described above, data model (including resources) are defined as protocol buffers which are language-neutral, platform-neutral, extensible mechanism for serializing structured data. Every resource definition may follow the following format, where the resource itself has a unique identifier (uid, which may also be referred to as a RID), a kind, a name, an api group to which the resource belongs, and a version. In addition, a resource may have a specification field (which may also be referred to as a "spec field"), which contains the specification of the resource, and a status field, which maintains the state of the resource. Such resources are defined as messages (which is the primary resource definition supported by protobufs). An example resource definition is provided below:

```
message Foo {
    string uid = 1;
    string kind = 2;
    string name = 3;
    string apiGroup = 5;
    int32 version = 6;
    FooSpec spec = 7;
    FooStatus status = 8;
}
message FooSpec {
    string uid += 1;?
    fooKeyA string = 2;?
    fooKeyB int32 = 3;?
    fooKeyC bool = 4;?
}
message FooStatus {
    status Status = 1;
}
message Status {
    state string = 1;
}
```

This above definition of the resource is registered by controller 326A (as one example) with API server 324 and can then be used by creating, reading, updating and deleting the resource by using a generic API applicable to all resources. The following is an example of a manifest defining a resource:

```
kind: Foo
name: foo1
apiGroup: foobars
spec:
fooKeyA: "keyA"
fooKeyB: 1
fooKeyC: true
```

This data structure is sent to the generic API servers, such as API server 324:

```
func (a *apiServer) Create(ctx context.Context, resource *Resources)
(*Results, error) {
}
func (a *apiServer) Read(ctx context.Context, resource *Resources)
(*Results, error) {
}
func (a *apiServer) Update(ctx context.Context, resource *Resources)
(*Results, error) {
}
func (a *apiServer) Delete(ctx context.Context, resource *Resources)
(*Results, error) {
}
```

Figure 4:
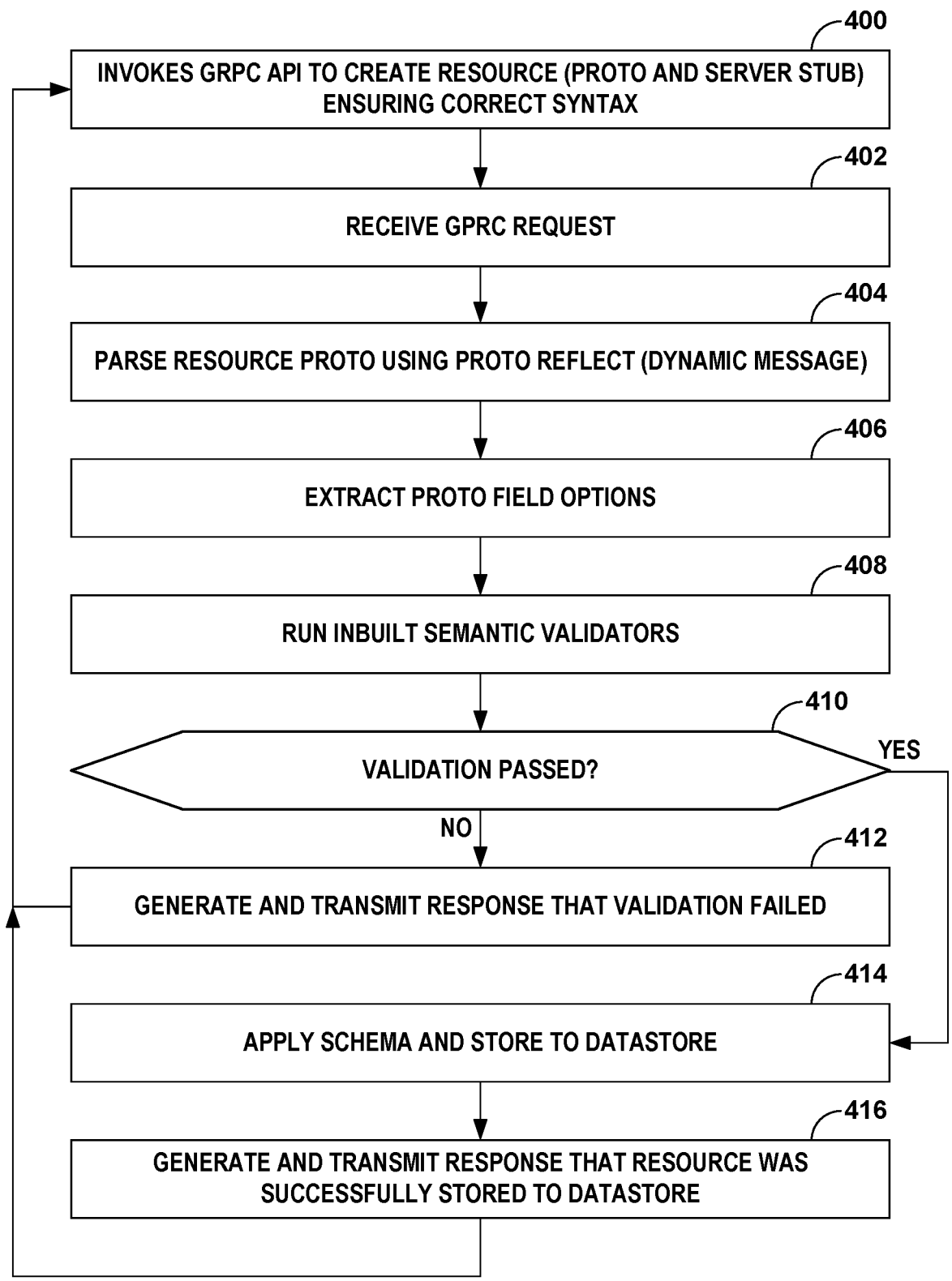
FIG. 4 is a flowchart illustrating example operation of the system shown in FIG. 2 in performing various aspects of the semantic validation techniques described in this disclosure.

FIG. 4 is a flowchart illustrating example operation of the system shown in FIG. 2 in performing various aspects of the semantic validation techniques described in this disclosure. Initially, client 228 may invoke gRPC/HTTP 250 (which represents gRPC API) to create a resource (which may be in the form of a proto and a server stub, where the server stub is a wrapper layer around the call layer and may be dynamically generated during proto formation) ensuring correct syntax (where client 228 may perform syntax validation) (400).

API server 224 may receive gRPC request (which is shown in the example of FIG. 2 as gRPC request 281) (402) and invoke API service 230, which parses the resource proto using proto reflect (which allows for a way to dynamically manipulate messages according to proto/message descriptors) (404).

API service 230 may next extract proto field options and run/apply inbuilt semantic validators (406, 408). That is, API service 230 may apply inbuilt semantic validators (which is another way to refer to semantic validation rules) to extracted field options and the underlying data specified for the resource. When validation is not passed (meaning the data specified for the resources does not meet the semantic validation rule conditions), API service 230 may generate and transmit a gRPC response message indicating that validation failed ("NO" 410, 412). When validation passes (meaning the data specified for the resource meets the semantic validation rule conditions), API service 230 may apply the schema identified for the data model to the resource and store the resource to datastore 225 ("YES" 410, 414). API service 230 may next generate and transmit a gRPC response indicating that the resource was successfully stored to datastore 225 (416).

In this respect, the resource definitions will ensure that input data is syntactically correct and only allow data types as defined. Further, to perform semantic validation of the data before such data is persisted to datastore 225, API server 224 may provide generic semantic validation functions that can be applied to any resource, where fields that are to be semantically validated are annotated in the resource definition. An example of such annotation in a resource definition is provide below.

```
message FooSpec {
string uid = 1;
fooKeyA string = 2 [(validate.unique) = true, (validate.regex) =
"aA-zZ", (validate.ipaddress) = true
fooKey6 int32 = 3 [(validate.min) = 10, (validate.max) = 200];
fooKeyC bool = 4;
}
```

The example implementation for min/max range validator is as follows:

```
func validateRange(descriptor protoReflect.FieldDescriptor,
value protoReflect.Value)
    opts :=
descriptor.Options( ).(*descriptorpb.FieldOptions)
    minRange, ok := proto.GetExtension(opts,
policyPB.E_RangeMin) . (int32)
    if ok && minRange > 0 {
        actMinRange := value.Int( )
        if actMinRange < int64(minRange) {
            fmt.Println("minRange too small")
            return false
        } else {
            fmt.Println("minRange ok")
        }
    }
    maxRange, ok := proto.GetExtension(opts,
policyPB.E_RangeMax) . (int32)
    if ok && maxRange > 0 {
        actMaxRange := value.Int( )
        if actMaxRange < int64(maxRange) {
            fmt.Println("maxRange too small")
            return false
        } else {
            fmt.Println("maxRange ok")
        }
    }
}
```

Figure 5:
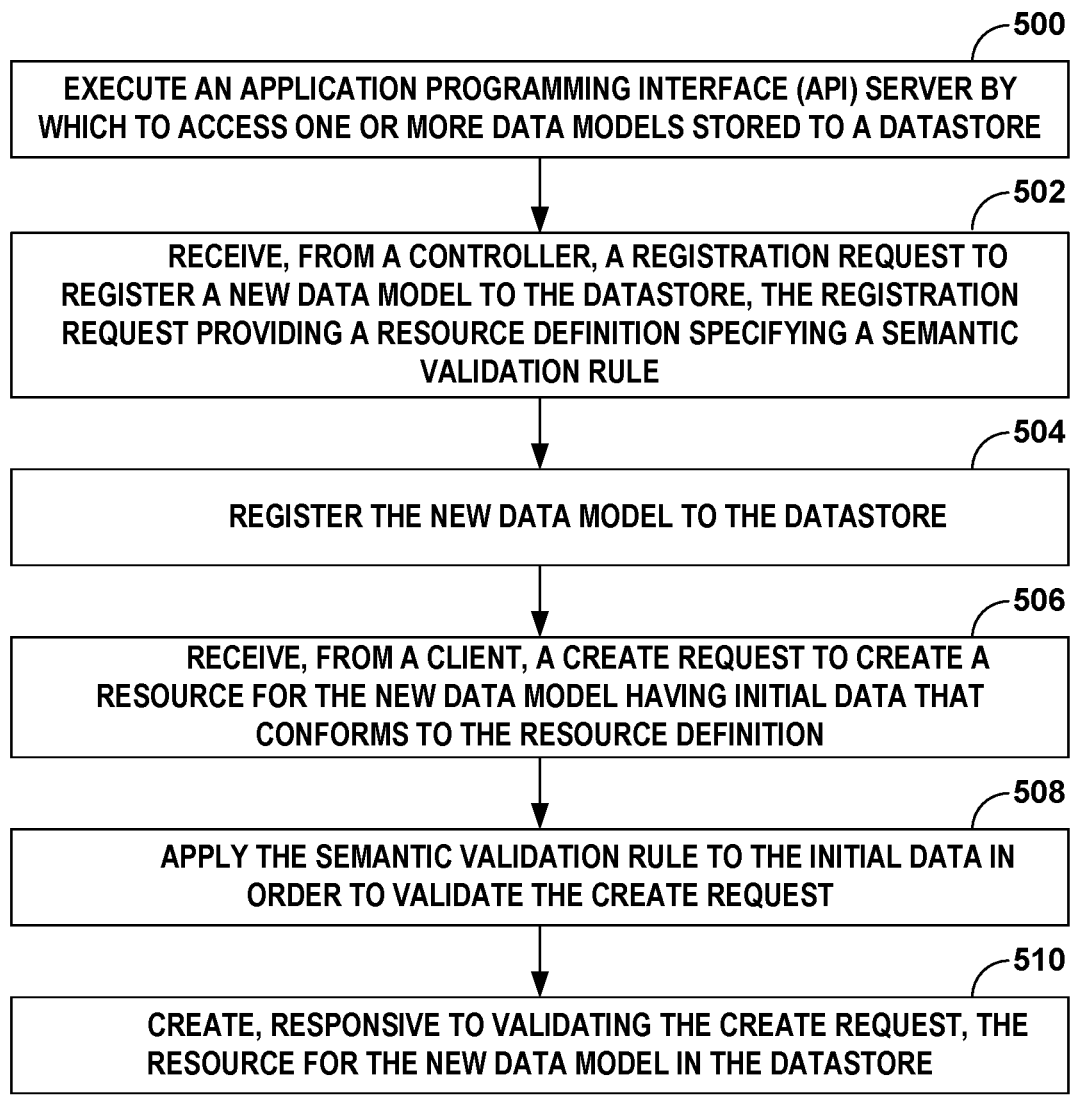
FIG. 5 is another flowchart illustrating example operation of the API server of FIG. 1 in performing various aspects of the techniques described in this disclosure.

FIG. 5 is another flowchart illustrating example operation of the API server of FIG. 1 in performing various aspects of the techniques described in this disclosure. Initially, network controller 114 may execute API server 124 by which to access one or more data models stored to datastore 125 (500). API server 124 may then wait for controllers 126 to connect. Network controller 114 may execute controllers 126, which may initialize and then generate a registration request to register a new data model to datastore 125. Controllers 126 may be developed with a preconfigured data model that defines data in support of topology/feature(s). The data model may conform to an industry standard, a proprietary standard, an open source standard, etc. and be specified in accordance with a formal data model language, such as the protocol buffer (often referred to as "protobuf") as described above. Controllers 126 may register one or more data models via separate registration requests or a single shared registration request.

In any event, API server 124 may receive, from a controller, such as controller 126A, the registration request to register a new data model to datastore 125, where definition of the data model may incorporate definition of the corresponding semantic validation rule to be applied to data specified in the fields of the data model (502). Responsive to receiving the registration request, API server 124 may register the new data model to datastore 125 (504). API server 124 may maintain an association of data models to controllers (which may be referred to as a registration table), which API server 124 may update to indicate that controller 126A is associated with the new data model as part of processing the registration request. In addition, API server 124 may translate the database agnostic data model (meaning the data model is not defined for any particular database language) into a database conforming to a particular database language supporting data store 125. In some instances, datastore 125 may include a number of different databases using multiple different database languages, such as SQL, XQuery, Object Query Language (OQL), GraphQL, Language Integrated Query (LINQ), etc.

API server 124, after translating the data model into a data schema that conforms to the underlying database language of the database supporting datastore 125 to which the data model will be stored, stores the data schema to the database supporting datastore 125. API server 124 may also parse out the semantic validation rules during translation, maintaining a semantic validation rule set identifying to which resources of the data schema each semantic validation rule applies. API server 124 may then transmit an acknowledgement to controller 126A indicating that the data model was stored to datastore 125.

Clients (which again are not shown in the example of FIG. 1, but may be executed by customer devices 120) may then proceed to interface with network controller 114 (and more specifically API server 124) to generate various requests. For example, the client may generate a create request to create a resource for the new data model having initial data that conforms to the resource definition specified in the data model. In some instances, these requests do not directly originate from the clients. Instead, the clients will interface with network controller 114 to define intents, which invokes one of controllers 126 (e.g., controller 126A) that translates the intents into low-level configuration data. Controller 126A may then generate requests that create resources for the new data model. Controller 126A may then transmit the create request to API server 124.

API server 124 may receive, from a client (e.g., directly from the client or indirectly from the client via controller 126A), the create request to create the resource for the new data model having initial data that conforms to the resource definition (506). API server 124 may identify to which data model the create request applies via a unique controller identifier (UCI) specified in the create request identifying controller 126A. API server 124 may perform a lookup in the registration table using the UCI to identify the new data model. In some instances, the create request may also specify a data model unique identifier (DMUI) when controllers 126 are capable of registering multiple data models. API server 124 may then distinguish between multiple registered data models using the DMUI.

After identifying the new data model, API server 124 may determine a resource being created (e.g., parse a resource identifier—RID) from the create request. API server 124 may then identify a semantic validation rule specified in the resource definition for the resource (which may be associated with the RID and indexed such that API server 124 may perform a lookup in the semantic validation rule set using the RID to identify the semantic validation rule). API server 124 may apply the semantic validation rule to the initial data in order to validate the create request (508). API server 124 may then create, responsive to validating the create request, the resource for the new data model in datastore 125 (510).

In this way, various aspects of the techniques may enable the following examples.

Example 1. A method comprising: executing, by a processor, an application programming interface (API) server by which to access one or more data models stored to a datastore; receiving, by the API server and from a controller, a registration request to register a new data model to the datastore, the registration request providing a resource definition specifying a semantic validation rule; registering, by the API server, the new data model to the datastore; receiving, by the API server and from a client, a create request to create a resource for the new data model having initial data that conforms to the resource definition; applying, by the API server, the semantic validation rule to the initial data in order to validate the create request; and creating, by the API server and responsive to validating the create request, the resource for the new data model in the datastore.

Example 2. The method of example 1, wherein registering the new data model comprises registering the new data model without restarting the API server and the datastore.

Example 3. The method of any combination of examples 1 and 2, wherein the request to register the new data model includes a protocol buffer that specifies the new data model and the semantic validation rule.

Example 4. The method of any combination of examples 1-3, wherein receiving the registration request comprises receiving the registration request to register the new data model to the datastore as a remote procedure call (RPC).

Example 5. The method of any combination of examples 1-4, wherein the resource definition includes a unique identifier, a resource type, a resource name, an API group, a version, a specification, and a status.

Example 6. The method of example 5, wherein the specification includes the semantic validation rule.

Example 7. The method of any combination of examples 1-6, wherein the semantic validation rule invokes a validation function supported by the API server.

Example 8. The method of any combination of examples 1-7, wherein applying the semantic validation rule comprises applying the semantic validation rule in addition to a syntax validation rule to the initial data in order to validate the create request.

Example 9. The method of any combination of examples 1-8, further comprising receiving, by the API server and from the client, one or more of a read request to read the resource, an update request to update the initial data of the resource, and a delete request to delete the resource.

Example 10. The method of any combination of examples 1-9, wherein the controller comprises a first controller, wherein a network controller includes the API server and a plurality of controllers, wherein the plurality of controllers include the first controller, wherein each of the plurality of controllers define a data model for configuring one or more aspects of an underlying network topology, and wherein the network controller provides one or more services in support of configuration and management of a network fabric.

Example 11. A device comprising: a memory configured to store a datastore that includes one or more data models; and one or more processors configured to: execute an application programming interface (API) server by which to access the one or more data models stored to the datastore, wherein the API server is configured to: receive, from a controller, a registration request to register a new data model to the datastore, the registration request providing a resource definition specifying a semantic validation rule; register the new data model to the datastore; receive, from a client, a create request to create a resource for the new data model having initial data that conforms to the resource definition; apply the semantic validation rule to the initial data in order to validate the create request; and create, responsive to validating the create request, the resource for the new data model in the datastore.

Example 12. The device of example 11, wherein the API server is, when configured to register the new data model, configured to register the new data model without restarting the API server and the datastore.

Example 13. The device of any combination of examples 11 and 12, wherein the request to register the new data model includes a protocol buffer that specifies the new data model and the semantic validation rule.

Example 14. The device of any combination of examples 11-13, wherein receiving the registration request comprises receiving the registration request to register the new data model to the datastore as a remote procedure call (RPC).

Example 15. The device of any combination of examples 11-14, wherein the resource definition includes a unique identifier, a resource type, a resource name, an API group, a version, a specification, and a status.

Example 16. The device of example 15, wherein the specification includes the semantic validation rule.

Example 17. The device of any combination of examples 11-16, wherein the semantic validation rule invokes a validation function supported by the API server.

Example 18. The device of any combination of examples 11-17, wherein the API server is, when configured to apply the semantic validation rule, configured to apply the semantic validation rule in addition to a syntax validation rule to the initial data in order to validate the create request.

Example 19. The device of any combination of examples 11-18, wherein the API server is further configured to receive, from the client, one or more of a read request to read the resource, an update request to update the initial data of the resource, and a delete request to delete the resource.

Example 20. A system comprising: a memory configured to store a datastore that includes one or more data models; and one or more processors configured to execute an application programming interface (API) server and a controller, wherein the controller is configured to: transmit, to the API server, a registration request to register a new data model to the datastore, the registration request providing a resource definition specifying a semantic validation rule; wherein the API server configured to: receive the registration request to register a new data model to the datastore; register the new data model to the datastore; receive, from a client, a create request to create a resource for the new data model having initial data that conforms to the resource definition; apply the semantic validation rule to the initial data in order to validate the create request; and create, responsive to validating the create request, the resource for the new data model in the datastore.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   executing, by a processor, an application programming interface (API) server by which to access one or more data models stored to a datastore;
   receiving, by the API server and from a controller, a registration request to register a new data model to the datastore, the registration request providing a resource definition specifying a semantic validation rule;
   registering, by the API server, the new data model to the datastore;
   receiving, by the API server and from a client, a create request to create a resource for the new data model having initial data that conforms to the resource definition;
   applying, by the API server, the semantic validation rule to the initial data in order to validate the create request; and
   creating, by the API server and responsive to validating the create request, the resource for the new data model in the datastore.

2. The method of claim 1, wherein registering the new data model comprises registering the new data model without restarting the API server and the datastore.

3. The method of claim 1, wherein the request to register the new data model includes a protocol buffer that specifies the new data model and the semantic validation rule.

4. The method of claim 1, wherein receiving the registration request comprises receiving the registration request to register the new data model to the datastore as a remote procedure call (RPC).

5. The method of claim 1, wherein the resource definition includes a unique identifier, a resource type, a resource name, an API group, a version, a specification, and a status.

6. The method of claim 5, wherein the specification includes the semantic validation rule.

7. The method of claim 1, wherein the semantic validation rule invokes a validation function supported by the API server.

8. The method of claim 1, wherein applying the semantic validation rule comprises applying the semantic validation rule in addition to a syntax validation rule to the initial data in order to validate the create request.

9. The method of claim 1, further comprising receiving, by the API server and from the client, one or more of a read request to read the resource, an update request to update the initial data of the resource, and a delete request to delete the resource.

10. The method of claim 1,
    wherein the controller comprises a first controller,
    wherein a network controller includes the API server and a plurality of controllers,
    wherein the plurality of controllers include the first controller,
    wherein each of the plurality of controllers define a data model for configuring one or more aspects of an underlying network topology, and
    wherein the network controller provides one or more services in support of configuration and management of a network fabric.

11. A device comprising:
    a memory configured to store a datastore that includes one or more data models; and
    one or more processors configured to:
    execute an application programming interface (API) server by which to access the one or more data models stored to the datastore,
    wherein the API server is configured to:
    receive, from a controller, a registration request to register a new data model to the datastore, the registration request providing a resource definition specifying a semantic validation rule;
    register the new data model to the datastore;
    receive, from a client, a create request to create a resource for the new data model having initial data that conforms to the resource definition;
    apply the semantic validation rule to the initial data in order to validate the create request; and
    create, responsive to validating the create request, the resource for the new data model in the datastore.

12. The device of claim 11, wherein the API server is, when configured to register the new data model, configured to register the new data model without restarting the API server and the datastore.

13. The device of claim 11, wherein the request to register the new data model includes a protocol buffer that specifies the new data model and the semantic validation rule.

14. The device of claim 11, wherein receiving the registration request comprises receiving the registration request to register the new data model to the datastore as a remote procedure call (RPC).

15. The device of claim 11, wherein the resource definition includes a unique identifier, a resource type, a resource name, an API group, a version, a specification, and a status.

16. The device of claim 15, wherein the specification includes the semantic validation rule.

17. The device of claim 11, wherein the semantic validation rule invokes a validation function supported by the API server.

18. The device of claim 11, wherein the API server is, when configured to apply the semantic validation rule, configured to apply the semantic validation rule in addition to a syntax validation rule to the initial data in order to validate the create request.

19. The device of claim 11, wherein the API server is further configured to receive, from the client, one or more of a read request to read the resource, an update request to update the initial data of the resource, and a delete request to delete the resource.

20. A system comprising:
    a memory configured to store a datastore that includes one or more data models; and one or more processors configured to execute an application programming interface (API) server and a controller, wherein the controller is configured to:

transmit, to the API server, a registration request to register a new data model to the datastore, the registration request providing a resource definition specifying a semantic validation rule;

wherein the API server configured to:

receive the registration request to register a new data model to the datastore;

register the new data model to the datastore;

receive, from a client, a create request to create a resource for the new data model having initial data that conforms to the resource definition;

apply the semantic validation rule to the initial data in order to validate the create request; and create, responsive to validating the create request, the resource for the new data model in the datastore.

* * * * *